(12) United States Patent
Miller et al.

(10) Patent No.: US 7,828,077 B1
(45) Date of Patent: Nov. 9, 2010

(54) ROTARY ANGLE TOOL

(75) Inventors: Jerry E. Miller, Traverse City, MI (US); Denny Wing-Chi Cheung, Traverse City, MI (US)

(73) Assignee: Jergens, Inc., Cleveland, OH (US)

( * ) Notice: Subject to any disclaimer, the term of this patent is extended or adjusted under 35 U.S.C. 154(b) by 182 days.

(21) Appl. No.: 12/127,300

(22) Filed: May 27, 2008

(51) Int. Cl.
*B23Q 5/28* (2006.01)
*E21B 3/00* (2006.01)
(52) U.S. Cl. .............................. 173/217; 173/6; 173/18
(58) Field of Classification Search ................ 173/5, 173/6, 13, 16, 15, 18, 29, 36, 217, 213, 170
See application file for complete search history.

(56) References Cited

U.S. PATENT DOCUMENTS

| 3,710,874 | A | | 1/1973 | Seccombe et al. |
|---|---|---|---|---|
| 3,872,951 | A | * | 3/1975 | Hastings, Jr. ................ 188/69 |
| 4,487,270 | A | | 12/1984 | Huber |
| 4,502,549 | A | * | 3/1985 | Hornung et al. ............. 173/183 |
| 4,518,298 | A | | 5/1985 | Yasukawa |
| 4,571,696 | A | | 2/1986 | Bitzer |
| 4,625,597 | A | * | 12/1986 | Cast ........................... 81/57.37 |
| 4,805,404 | A | * | 2/1989 | Dupin .......................... 60/409 |
| 4,887,499 | A | | 12/1989 | Kipfelsberger |
| 4,922,436 | A | | 5/1990 | Dohm et al. |
| 4,987,806 | A | | 1/1991 | Lehnert |
| 5,033,552 | A | * | 7/1991 | Hu .............................. 173/217 |
| 5,115,701 | A | | 5/1992 | Lehnert |
| 5,315,501 | A | | 5/1994 | Whitehouse |
| 5,501,107 | A | | 3/1996 | Snyder et al. |
| 5,544,534 | A | | 8/1996 | Fujitaka |
| 5,637,968 | A | | 6/1997 | Kainec et al. |
| 5,701,961 | A | * | 12/1997 | Warner et al. ................. 173/15 |
| 5,708,216 | A | | 1/1998 | Garshelis |
| 5,898,598 | A | | 4/1999 | Szwast et al. |
| 5,898,599 | A | | 4/1999 | Massie et al. |
| 6,167,788 | B1 | | 1/2001 | Schonberger et al. |
| 6,311,786 | B1 | | 11/2001 | Giardino et al. |
| 6,405,158 | B1 | | 6/2002 | Massie et al. |
| 6,424,799 | B1 | | 7/2002 | Gilmore |
| 6,523,442 | B2 | | 2/2003 | Lehnert et al. |
| 6,923,268 | B2 | * | 8/2005 | Totsu ............................. 173/2 |
| 7,021,399 | B2 | * | 4/2006 | Driessen ...................... 173/29 |
| 7,090,030 | B2 | | 8/2006 | Miller |
| 7,210,541 | B2 | | 5/2007 | Miller |

\* cited by examiner

*Primary Examiner*—Paul R Durand

(57) ABSTRACT

A rotary angle tool is provided for driving a fastener while controlling the rotational speed of the chuck by varying the pressure or force of the tool against the fastener. The tool includes an angled chuck assembly that is drivable by a motor, an output shaft of the chuck assembly having a rotational axis that is non-parallel to the rotational axis of the motor drive shaft. A sensor is responsive to the proximity of or movement of a detectable element at the chuck output shaft. The sensor generates a signal for controlling the output of the motor in response to detection of the proximity or movement of the detectable element. Moving the chuck output shaft by urging the rotary tool against a fastener varies the proximity of the detectable element relative to the sensor and the sensor output or control proportionally varies the power supplied to the motor.

7 Claims, 2 Drawing Sheets

ROTARY ANGLE TOOL

FIELD OF THE INVENTION

The present invention relates generally to rotary drivers for fasteners and, more particularly, to angled drivers that drive fasteners via an output shaft that is at an angle relative to a motor output or drive shaft.

BACKGROUND OF THE INVENTION

Various powered drivers are known for rotatably driving fasteners, such as threaded bolts, threaded nuts, screws, and the like. Some tools require the user to activate a switch or trigger to activate the tool. Typically, such tools include a chuck that is inline with a motor, which is provided for driving the chuck to drive the fastener. Examples of such inline tools are described in U.S. Pat. Nos. 7,210,541 and 7,090,030.

SUMMARY OF THE INVENTION

The present invention provides a rotary tool having a motor of variable output speed, with the motor being controllable by a variable voltage device. A chuck assembly is coupled to the motor in a non-parallel orientation such that the chuck assembly rotates about a different axis than the motor's axis of rotation. For example, the chuck assembly may be oriented at approximately ninety degrees relative to an output shaft or drive shaft of the motor so that the chuck axis is substantially perpendicular to the motor drive axis. At least a portion of the chuck assembly is movable along the chuck axis, with the movable portion of the chuck assembly being detectable by a detecting device or sensor that generates an output indicative of the location or proximity of the movable portion to the sensor.

In one form, the movable end portion may include a magnetic element or magnet that produces a magnetic field, with the strength of the magnetic field being detectable by a variable voltage device or magnetoresponsive sensor in the tool, and the output speed of the motor being responsive to the variable voltage device. Thus, the rotary tool may be positioned at a fastener and urged toward the fastener to move the chuck assembly and thereby control the speed of the motor according to the amount of force applied by the tool against the fastener.

Optionally, the sensor or variable voltage device may comprise a Hall effect sensor or transformer for detecting the field strength of a magnetic field emitted by a field device, such as a permanent magnet provided on the chuck assembly. The strength of the magnetic field that is applied to the Hall effect sensor increases as the chuck assembly is urged further into or toward the rotary tool, such as in response to the tool being urged against the fastener. Optionally, the magnetic field at the variable voltage device varies proportionally with the proximity of the magnetic field device or magnet to the variable voltage device, thus permitting proportional control of the motor according to the position of the chuck assembly. Optionally, the variable voltage device may be operable to activate and deactivate motor and/or to control or adjust the output speed of the motor by varying the voltage applied to the motor.

Optionally, a resilient element, such as a coil spring or the like, is provided at the chuck assembly to bias the assembly toward the fastener being driven by the tool. Urging the tool toward the fastener and against the bias of the spring increases the magnitude of the magnetic field applied to the variable voltage device and thus increases the speed of the motor, thereby increasing the rotational output or driving speed applied by the chuck to the fastener.

Optionally, the tool includes a torque transducer for measuring the amount of torque generated by the chuck assembly. The tool may include a strain gauge operatively coupled to the torque transducer. The strain gauge transmits data representative of the torque generated at the chuck assembly, and the data is used to terminate operation of the motor when the torque generated by the chuck assembly reaches a predetermined or threshold level. The tool thus may drive a fastener to a desired or preset or threshold torque and may do so at a variable speed as determined by the urging of the tool toward the fastener by the tool operator.

Therefore, the rotary tool of the present invention is controllable according to the amount of force applied to the tool against a fastener engaged by a chuck on the tool. The chuck is oriented in a non-parallel orientation relative to the motor axis, and is movably disposed on the tool such that urging the tool against a fastener engaged by the chuck assembly causes the chuck assembly to move relative to the tool. Thus, the activation of the tool motor (such as turning the motor on and off) and/or the speed of the motor is/are controllable by varying the force applied to the rotary tool in the direction of the fastener being engaged by the chuck assembly.

These and other objects, advantages, purposes, and features of the present invention will become apparent upon review of the following specification in conjunction with the drawings.

DESCRIPTION OF THE PREFERRED EMBODIMENTS

Figure 1:
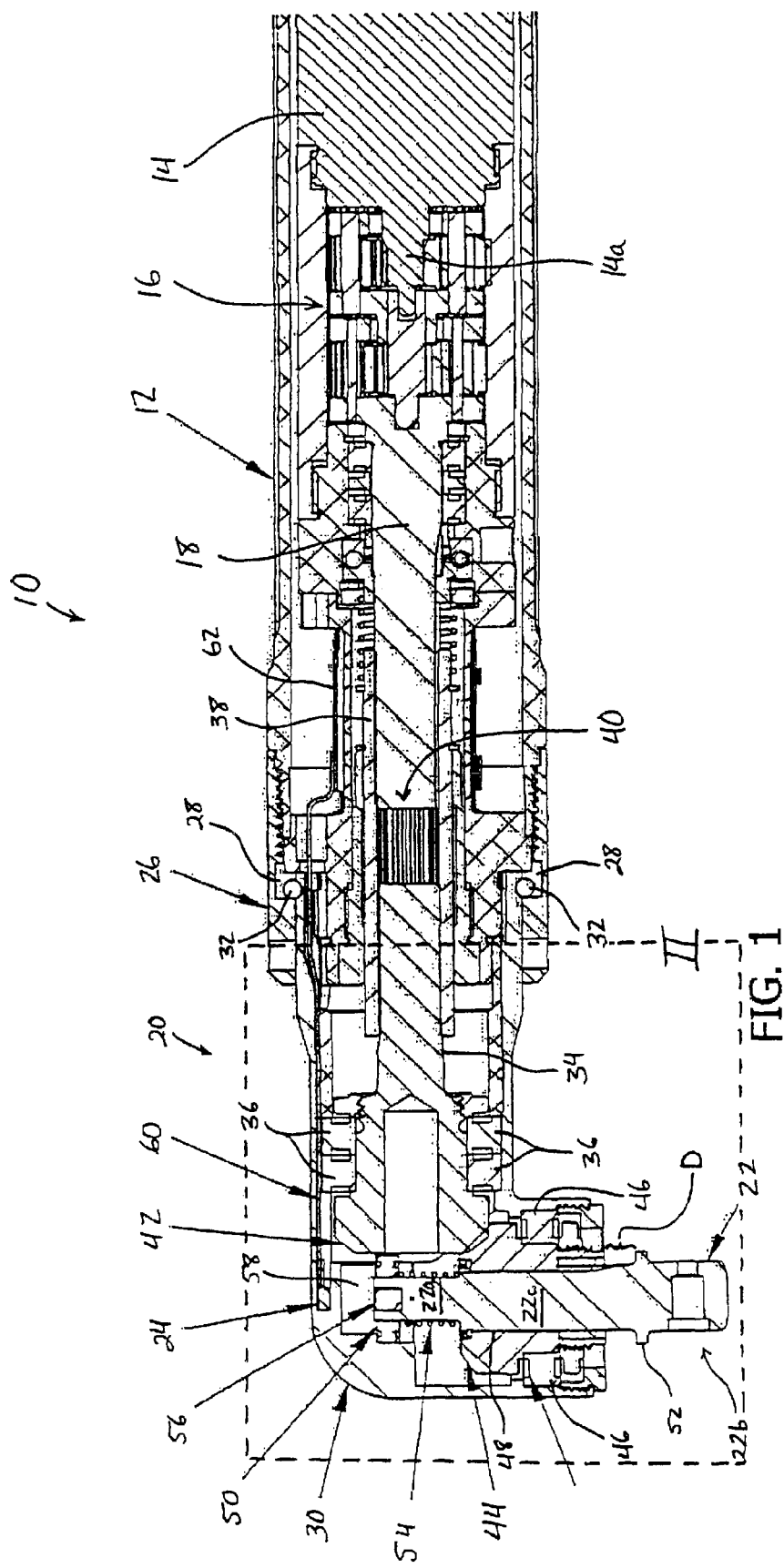
FIG. 1 is a sectional view of a portion of a rotary tool in accordance with the present invention, with a chuck assembly shown in an extended position.

Referring now to the drawings and the embodiments illustrated therein, a fastener driver or rotary tool or nut runner 10 is provided for tightening or loosening or installing a fastener (FIG. 1). Rotary tool 10 includes a tool body or main body 12 that houses a motor 14, a gear train 16, and a drive shaft 18 aligned substantially coaxially with motor 14. A right angle tool head 20 is coupled at main body 12 through the use of mating male and female splines and a threaded coupler 26 that secures the right angle housing 30 to the main body 12. The right angle tool head provides both a right angle output shaft 22 and a sensor or detecting device or variable voltage device 24 for detecting the location or proximity of the right angle output shaft 22 (such as a magnetoresponsive sensor or Hall effect sensor for detecting a detectable element or triggering element or portion 56 at the output shaft, such as a magnetic field element or device at the output shaft), whereby the motor activation/deactivation and/or motor output or drive speed is controlled in response to the variable voltage device, as will be described in detail below.

Motor 14 is operable to rotatably drive the drive shaft 18 via gear train 16, such as in any suitable or known manner. As can be seen in FIG. 1, an output shaft 14a of motor 14 is coaxially aligned with drive shaft 18, which is also coaxially aligned with an input shaft 34 of the right angle tool head 20, such that operation of motor 14 rotatably drives input shaft

34, as discussed below. For example, the operation and control of motor 14, gear train 16 and drive shaft 18 may be similar to that of the inline tools described in U.S. Pat. Nos. 7,210,541 and 7,090,030, which are hereby incorporated herein by reference in their entireties.

In the illustrated embodiment, right angle tool head 20 is joined to main body 12 by a threaded coupler 26, which engages a ring 32 at the proximal end of a housing 30 of right angle tool head 20 (such as a metallic or steel ring 32 at a flange or lip 28 at the proximal end of the housing) as the threaded coupler 26 engages threads at the distal end of main body 12. Optionally, coupler 26 is removable and interchangeable with other tool heads, such as tool heads angled at various angles between about zero degrees and about ninety degrees, or at angles greater than ninety degrees, depending on the particular application of the rotary tool.

Input shaft 34 of right angle tool head 20 is rotatably supported in tool head housing 30 by bearings 36 so that input shaft 34 is substantially coaxial with drive shaft 18 and motor 14 when right angle tool head 20 is attached to or coupled with main body 12. When right angle tool head 20 is attached to or coupled with body 12, input shaft 34 is received in a female spline or coupler 38 of main body 12. Female spline or coupler 38 similarly receives drive shaft 18 at its end opposite input shaft 34 to couple the drive shaft of the motor or tool to the input shaft of the tool head. For example, the coupler 38 may have splines formed along its inner surface (or may otherwise be non-circular in cross sectional shape) and the input shaft 34 and drive shaft 18 may have splines formed along their respective outer surfaces (or may otherwise be non-circular in cross sectional shape to correspond to the shape of the coupler), so that the input shaft and drive shaft are non-rotatably received in the coupler. Input shaft 34 is thus coupled to drive shaft 18, such as via a splined interface or junction or female spline or coupler 38, so that input shaft 34 is rotatably drivable by drive shaft 18 and rotated about a common axis of rotation.

In the illustrated embodiment, input shaft 34 includes a bevel gear 42 at an end opposite female spline or coupler 38. Bevel gear 42 engages or intermeshes with a complementary bevel gear 44 of right angle output shaft 22 of tool head 20. The teeth of the bevel gears are formed so as to mesh with one another so that the drive shaft rotatably drives the output shaft in response to rotational driving by the motor. The bevel gears thus transform the rotational driving about the drive shaft axis to rotational driving of the output shaft about an output shaft axis of rotation, which is at an angle relative to the drive shaft axis. In the illustrated embodiment, right angle output shaft 22 and bevel gear 44 are oriented with their respective rotational axes substantially perpendicular to the rotational axes of input shaft 34, drive shaft 18, output shaft 14a, and motor 14. However, the bevel gears 42, 44 may be otherwise formed and engaged to accommodate other angles between the output shaft and the drive shaft.

Bevel gear 44 of right angle output shaft 22 is rotatably mounted in tool head housing 30 and supported by bearings 46 that substantially prevent axial translation of bevel gear 44. In the illustrated embodiment, right angle output shaft 22 is received in and along and through a hollow axial center portion 48 of bevel gear 44, and is capable of sliding or translating axially through bevel gear 44. The right angle output shaft 22 is non-rotatably received in bevel gear 44 (such as via an outer surface of the output shaft having splines that engage a correspondingly splined inner surface of the bevel gear or via other non-circular cross sectional shapes of the outer surface of the output shaft and inner surface of the bevel gear). Optionally, for example, the output shaft 22 may include a non-circular shaft body 22c that is complementary to the interior surface of hollow center portion 48 of bevel gear 44. For example, shaft body 22c and the inner surface of bevel gear 44 (at hollow center portion 48) may comprise splined surfaces, one or more complementary ridges and slots, oval sections, or substantially any non-circular shape, such as triangular, square, pentagonal, hexagonal, or the like, such that shaft body 22c is capable of axially translating within bevel gear 44, and is substantially incapable of rotating relative to bevel gear 44. Thus, bevel gear 44 is capable of rotatably driving shaft 22 while allowing the shaft its full range of axial extension and retraction.

In the illustrated embodiment, proximal end portion 22a of output shaft 22 extends through bevel gear 44 and has the triggering element or detectable element or portion or field element or magnet 56 disposed thereat, whereby the variable voltage device or sensor 24 is disposed at or near the junction of the bevel gears to detect the proximity of the magnet during operation of the tool, as discussed below. The proximal end portion 22a of output shaft 22 is rotatably supported by a bearing 50 that is spaced from bevel gear 44 and that permits output shaft 22 to translate axially relative to bearing 50 and bevel gear 44. Thus, the output shaft 22 is rotatably driven by bevel gear 44 and is translationally movable along and relative to bevel gear 44, such that the proximal end portion 22a of output shaft 22 is movable relative to the bevel gears and the sensor 24, which may be fixedly mounted at the housing or at or near the junction of the bevel gears.

Although shown and described as having the output shaft slidably and non-rotatably received within and through the bevel gear, it will be appreciated that the tool may incorporate alternate means or methods of coupling the right angle output shaft to the bevel gear such that they rotate together while permitting axial translation of the output shaft relative to the gear, while remaining within the spirit and scope of the present invention. For example, the output shaft may comprise a non-cylindrical hollow portion that receives a non-cylindrical shaft extending from the bevel gear. In such a configuration, the variable voltage device or sensor may be positioned elsewhere on the tool and within the housing, such as alongside a portion of the shaft on which the magnet (or other sensor triggering device or element) is mounted, so that the variable voltage device senses the position of the magnet or field element or device on the movable output shaft as the shaft moves longitudinally relative to the bevel gear. Also, although shown and described as having bevel gears to convert the rotational driving of the drive shaft to a rotational output of the chuck output shaft at an angle relative to the drive shaft, it is envisioned that other conversion or coupling means may be implemented (such as other gears or gear assemblies or couplers or the like at the junction of the drive shaft and the chuck output shaft), while remaining within the spirit and scope of the present invention.

In the illustrated embodiment, output shaft 22 includes a flange 52 near a distal end portion 22b of output shaft 22. Flange 52 serves to limit the axial extent to which a driver, such as a socket driver or the like, may be installed at distal end portion 22b of output shaft 22. Additionally, flange 52 may limit the distance by which right angle output shaft 22 will retract into right angle tool head 20 during operation of the tool (such as can be seen with reference to the maximum retraction or compression distance D in FIG. 3). The distal end portion 22b of output shaft 22 may be configured to attach to a socket head or other fastener driving means (not shown), which may be readily connected to or attached to the output shaft to adapt the tool for driving a targeted or selected fastener (such as a bolt or nut or the like).

In the illustrated embodiment, right angle tool head 20 includes a biasing element or resilient member 54, such as a coil spring or the like, that is generally coaxial with and substantially surrounds proximal end portion 22a of right angle output shaft 22, with one end of biasing element 54 engaging bearing 50 (or engaging a portion of the housing or internal body or frame of the tool head 20 generally at or near bearing 50), and the opposite end of biasing element 54 engaging a step or lip of output shaft 22. Biasing element 54 is installed in compression so as to bias or urge or extend right angle output shaft 22 outwardly away from bearing 50 so as to extend the shaft from right angle tool head 20. Thus, when output shaft 22 is not being urged or pressed against a fastener or other surface, biasing element 54 biases or urges the output shaft 22 outward from right angle tool head 20 (such as in the downward direction in FIGS. 1-3). When the output shaft is pressed or urged against a fastener or other surface by a user grasping rotary tool 10 and pressing the socket at the outer or distal end of the output shaft of the tool head toward or against the fastener, output shaft 22 is retracted or compressed partially into the tool head body or housing and up to a maximum distance D (FIGS. 1 and 2) into the tool head body or housing.

In order to determine the degree of extension and retraction of drive shaft 22, right angle tool head 20 includes a detectable element or portion or sensor triggering device or element 56 at its proximal end portion 22a that is detectable by the sensor or variable voltage device 24. In the illustrated embodiment, the detectable element 56 comprises a magnetic field device, such as a permanent magnet or the like, which may be disposed at or near proximal end portion 22a of right angle output shaft 22, and which generates a magnetic field that is detected by variable voltage device or sensor 24. The sensor or variable voltage device thus may detect the movement of or proximity of the proximal end portion 22a of output shaft 22 relative to the sensor and thus relative to the bevel gears 42, 44, and may generate an output signal indicative of such movement or proximity, whereby the motor may be activated/deactivated and/or adjusted or controlled in response to the output signal of the variable voltage device (which may vary the voltage applied to the motor between zero volts (motor off condition or state) and a preselected or set or on level (whereby the sensor is operable to turn the motor on and off in response to detection of a threshold proximity level or the like) or between zero volts (off) and any degree of voltage within the operating range of the motor (with the voltage applied to the motor and thus the output speed of the motor being adjusted proportionally and in accordance with the detected proximity and/or movement of the output shaft).

Detectable element 56 and proximal end portion 22a of output shaft 22 are substantially free to translate into and out of a cavity 58 defined by housing 30, as output shaft 22 extends and retracts relative to bevel gear 44 and housing 30 of right angle tool head 20. In the illustrated embodiment, detectable element 56 is disposed at end portion 22a of output shaft 22, which protrudes through bevel gear 44 and toward the wall of housing 30. Sensor 24 is positioned at the wall of housing 30 at or near cavity 58 and generally at or near the junction of the bevel gears 42 and 44, and approximately along the rotational axis of right angle output shaft 22. Sensor 24, which may comprise a magnetoresponsive sensor, such as a Hall effect sensor or the like, may be sensitive to the magnetic field strength emitted by detectable element or magnet 56 (whereby the detected magnetic field decreases in intensity as the magnet moves to increasingly greater distances from the sensor) and generates an output or control signal that varies with the proximity of the magnet to the sensor. The output or control signal is transmitted to motor 14 (or other controller or control circuitry of the tool that is operable to control the motor), such as via a conductor or wire 60 in right angle tool head 20. Wire 60 electrically engages or couples to a corresponding conductor 62 in main body 12 when right angle tool head 20 is coupled to main body 12, whereupon conductor 62 passes the signal on to motor 14, such as through a controller (not shown), and such as in a manner described in U.S. Pat. Nos. 7,210,541 and 7,090,030, incorporated above.

Figure 2:
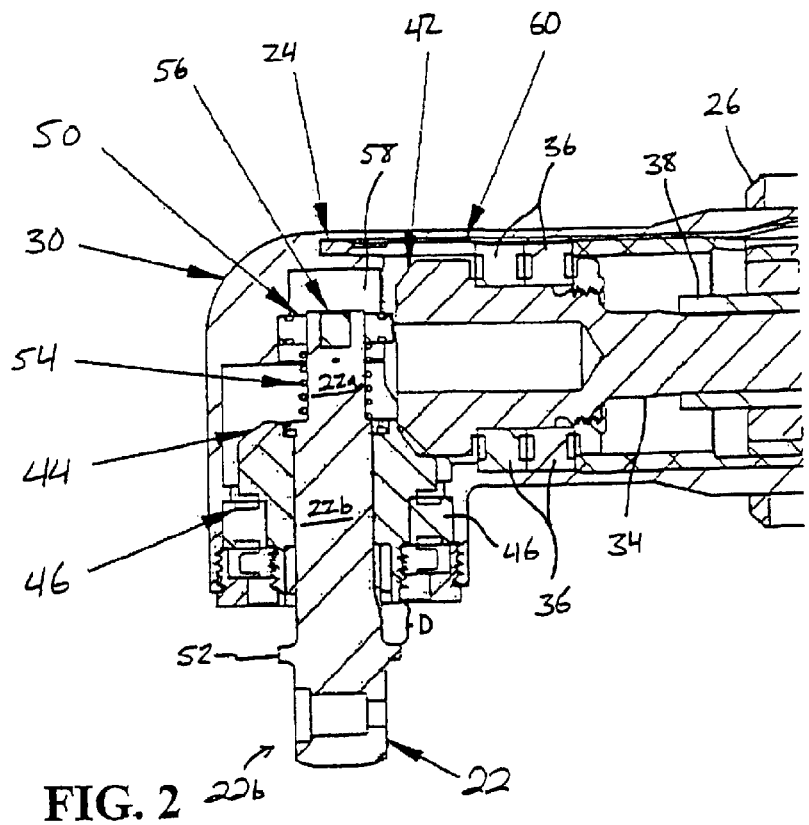
FIG. 2 is an enlarged sectional view of the area designated II in FIG. 1.
Figure 3:
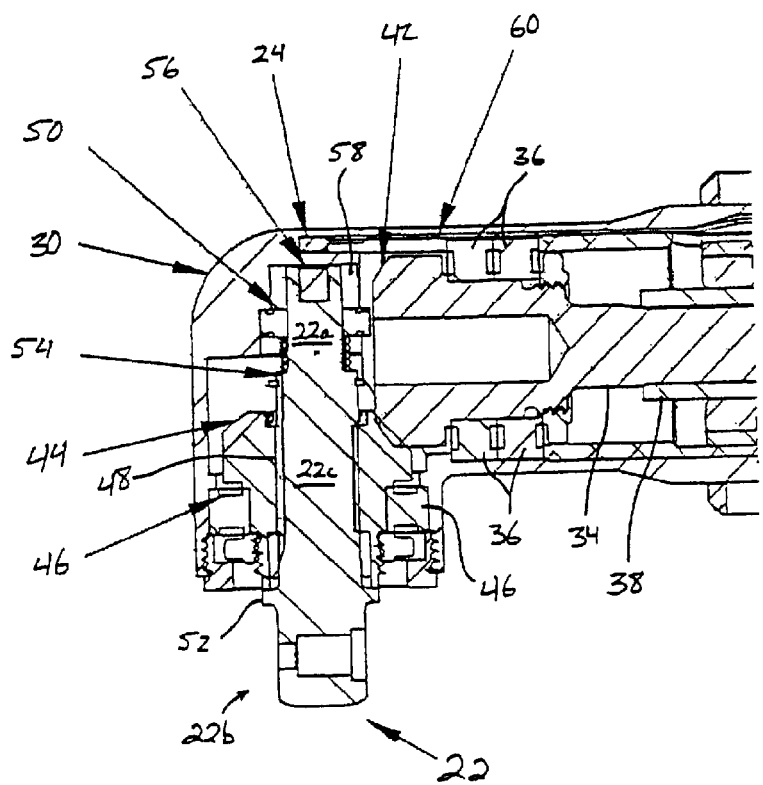
FIG. 3 is another enlarged sectional view of the area of FIG. 2, with the chuck assembly shown in a retracted position.

Optionally, sensor 24 may comprise a Hall effect sensor and/or sensor 24 may comprise a digital or linear output sensor whose output signal varies proportionally with the level of the detected magnetic field, which in turn varies proportionally with the proximity of detectable device or magnet 56 at proximal end portion 22a of output shaft 22 to the sensor 24. When output shaft 22 is at its relaxed or extended position and biased outwardly by biasing element 54, the magnet at end portion 22a is at an increased or maximum distance away from sensor 24 (such as shown in FIGS. 1 and 2), whereby the sensor 24, responsive to the magnet, may generate a signal indicative of this extended position to motor 14 (or may provide no signal to motor 14), whereby the motor remains de-energized or off (or optionally at a low output speed) in response to the signal or lack thereof. As rotary tool 10 is urged toward and onto a fastener or against a fastener or other element or surface and further pressed toward the fastener so as to exert an increased force against the fastener, output shaft 22 is urged or retracted against biasing element 54 and further into the tool head body or housing such that the detectable element or magnet 56 and proximal end portion 22a of output shaft 22 are urged into cavity 58 of housing 30, and thus toward and closer to sensor 24 (such as shown in FIG. 3), thereby increasing the strength of the magnetic field present at and in the vicinity of and as detected by the sensor. Sensor 24 detects the increased strength in the magnetic field and varies its output signal accordingly, which causes motor 14 to activate and/or increase its operating speed.

Optionally, the degree of movement or degree of proximity of the output shaft may be detected (such as via an analog sensor whose output signal varies with the detected strength of the proximate magnetic field) and the output speed of the motor may be controlled or adjusted responsive to such detection (in such an embodiment, the tool may optionally have a separate on/off switch to initially activate the motor and to deactivate the motor when not in use, with the sensor and controller controlling the motor, when activated, responsive to the detected proximity of the magnet), or optionally, the motor may be activated and deactivated in response to detection of the output shaft moving a threshold amount relative to the sensor (such as via detection of such output shaft movement or output shaft proximity via a digital sensor), whereby further movement of the output shaft toward the sensor does not lead to adjustment of the output speed. Thus, the user may control the activation or on/off status of motor 14, and/or may control the rotational output speed of motor 14 in order to drive a fastener at a selected or desired speed and to the desired or selected torque by adjusting the pressing force of rotary tool 10 against the fastener.

Accordingly, rotary tool 10 provides a chuck that is oriented non-parallel to the motor, which facilitates access to fasteners in limited-access locations, and which facilitates manually holding the tool during high-torque applications due to the main body's orientation relative to the chuck. By orienting the main body at about ninety degrees (or other angle as may be desired) relative to the rotational axis of the chuck, a user is provided with a gripping portion (main body 12) that extends along the moment arm of the chuck, thus reducing the anti-rotation force that the user must apply against the main body to resist the torque at the chuck as compared with tools having main bodies substantially inline with their chuck and correspondingly reduced moment arms. Optionally, the rotary tool may be activated without a separate activation switch by urging the tool toward the fastener, and the tool's speed may be adjustable according to the amount of force applied to the tool against the fastener (such as in response to a detection of movement or proximity of a portion of the output shaft relative to a sensor, as discussed above).

Optionally, the rotary tool may include a torque transducer for measuring the amount of torque applied to a fastener by the chuck assembly. For example, the torque transducer may include one or more strain gauges for generating torque data. The torque data may be provided to the motor via a controller, such as to limit the maximum torque applied to the fastener and/or to de-energize the motor when the torque generated at the chuck assembly reaches a predetermined amount. The use of such a torque transducer and/or strain gauge in such a manner is more fully described in commonly assigned and previously-incorporated U.S. Pat. Nos. 7,210,541 and 7,090,030. By providing a right angle tool head that is generally at ninety degrees (or other angle) relative to the tool body, the rotary tool of the present invention provides enhanced fastener driving and may be capable of driving fasteners to greater torques as compared to inline rotary tools. Optionally, and for example, the maximum or selected output torque at right angle output shaft 22 may be up to about 132 inch-pounds (in-lb), although it will be appreciated that substantially any torque may be applied at the output shaft without departing from the scope of the present invention.

Although shown and described as having a magnet and magnetoresponsive sensor, it is envisioned that other means for detecting translational movement of the output shaft relative to the gears or housing of the right angle tool head may be implemented. For example, the sensor may comprise an optical sensor or other type of electrical sensor for detecting a triggering element or portion of the output shaft (such as a surface area or marked region of the output shaft) and for generating an output signal indicative of movement or the location or proximity of the output shaft relative to the sensor. For example, an optical sensor may determine the movement or location or degree of extension of the output shaft by detecting spaced apart markings or indicia along the output shaft and may generate an output or control signal responsive to such detection and indicative of the degree of extension of the output shaft relative to the tool head body. Optionally, for example, the sensor may comprise mechanical detecting means that mechanically detects the end portion (or other portion) of the output shaft and that generates an output signal responsive to such detection. For example, the sensor may comprise a switch or movable element that contacts an end portion or other portion (such as a triggering element or protrusion) of the output shaft and generates an output signal responsive to detection of movement of the output shaft relative to the sensor, or the sensor may comprise a roller or wheel that rollingly engages an outer surface of the movable output shaft (at or near the end portion that protrudes through the gear or at another outer surface of the shaft if the shaft receives the gear therein as discussed above), whereby the degree of movement of the output shaft is determined by the sensor and the sensor output signal is indicative of the degree of movement of the output shaft relative to the sensor and gear and housing of the right angle tool. Other mechanical or electrical or optical means that are responsive to or triggered by the proximity of or movement of a detectable element or triggering element may be implemented while remaining within the spirit and scope of the present invention.

Therefore, the present invention provides a right angle rotary tool that is operable to drive a fastener at an angle relative to the motor output shaft and drive shaft, while providing enhanced control over the activation/deactivation of the tool and/or the output speed of the tool. The right angle rotary tool detects the movement and/or proximity of the output shaft (or of a detectable or triggering element at the output shaft) relative to an initial or off position and may control activation/deactivation of the motor and/or the output speed of the motor in response to such detection. The right angle rotary tool of the present invention thus provides enhanced control and operation of a right angle tool, which may provide enhanced fastener driving and greater torque depending on the particular application of the right angle rotary tool.

Thus, a number of challenges are overcome in the design of a rotary angle tool or nut runner, such as, for example, packaging a sensor and/or switch inside the angled tool head, providing a mechanical device for turning the tool on and off, and providing electrical power to the switch while receiving a motor-control signal back from the switch. The output shaft thus delivers torque from the motor to a fastener via the gear train and the meshing of the beveled gears of the output shaft and the drive shaft. The output shaft also serves as a switch to activate or energize or control the motor when the shaft is urged into the tool housing.

Many fastening operations require an operator to securely engage a driver (such as a socket or tool bit) to the output shaft and then engage a fastener with the driver by pushing or holding the tool against the fastener and against the torque of the tool, so that the normal pushing and holding of the tool will cause the output shaft to retract into the housing as the pushing force exceeds the opposing spring force and any frictional resistance to relative movement between the output shaft and the bevel gear that drives it. As the magnet or detectable element or triggering element disposed at or embedded or fastened at the end of the output shaft is urged toward the sensor, the sensor sends a signal to the controller or control circuitry of the tool, which uses controller logic to energize and/or increase the speed output of the motor. Either digital or analog sensors (or other suitable sensors) may be accommodated by the design. For example, a digital sensor may provide an on/off signal, while an analog sensor may provide a signal that changes proportionally with respect to the position of the magnet on the output shaft. The proportionality of the signal from an analog Hall effect sensor or the like may be translated by the controller logic to vary the speed of the motor.

Thus, it will be appreciated that the rotary angle tool of the present invention presents several advantages, such as simplifying the fastening process and obviating the need for a rotatable tool head. By employing a "push-to-start" feature, the present invention does not require a separately-actuated switch on the housing of the ninety degree angle tool, such as a button or lever or the like, in order to activate the motor. Therefore, an operator need not hold the tool in such a way that a switch can be triggered independent of (or in addition to) the operator's grip on the tool. Some angle-headed tools require a rotatable head (i.e. the tool head rotates about the motor axis) to permit access to a separate on/off switch on the housing when using the tool, such as in small or difficult-to-access work areas, whereas the present invention need not The embodiments of the invention in which an exclusive property is claimed are defined as follows:

1. A rotary tool for driving a fastener, said rotary tool comprising:
a motor operable to provide a rotational force and having a rotational axis;
a motor output shaft associated with said motor;
a drive shaft rotatably driven by said motor via said motor output shaft, said motor output shaft and said drive shaft having substantially parallel axes of rotation, said drive shaft comprising a first gear at its end opposite said motor output shaft;
a chuck assembly, said chuck assembly comprising a second gear and a chuck output shaft for rotatably driving a fastener, said chuck output shaft having a rotational axis that is non-parallel to the rotational axis of said drive shaft, wherein said chuck output shaft is adapted to rotate with said second gear and translate axially relative to said second gear;
wherein said first gear imparts rotation to said second gear and said chuck output shaft to rotate said chuck output shaft about the rotational axis of said chuck output shaft when said motor is activated;
a sensor responsive to at least one of (a) movement of said chuck output shaft relative to said second gear and said sensor and (b) proximity of said chuck output shaft to said sensor, and wherein said sensor generates an output signal indicative of said at least one of (a) movement of said chuck output shaft relative to second gear and said sensor and (b) proximity of said chuck output shaft to said sensor, and wherein said motor is responsive to said output signal; and
wherein said sensor detects longitudinal movement of said chuck output shaft relative to said second gear whereby the power supplied to said motor is proportionally adjusted to variably alter the corresponding rotational speed of said chuck assembly in response to said detection of longitudinal movement of said chuck output shaft relative to said second gear.

2. The rotary tool of claim 1, wherein the rotational axis of said chuck assembly is oriented at about ninety degrees to the rotational axis of said drive shaft.

3. A rotary tool for driving a fastener, said rotary tool comprising:
a motor operable to provide a rotational force and having a rotational axis;
a motor output shaft associated with said motor;
a drive shaft rotatably driven by said motor via said motor output shaft, said motor output shaft and said drive shaft having substantially parallel axes of rotation, said drive shaft comprising a first gear at its end opposite said motor output shaft;
a chuck assembly, said chuck assembly comprising a second gear and a chuck output shaft for rotatably driving a fastener, said chuck output shaft having a rotational axis that is non-parallel to the rotational axis of said drive shaft, wherein said chuck output shaft is adapted to rotate with said second gear and translate axially relative to said second gear, and wherein said second gear comprises a hollowed shaft and wherein said chuck output shaft is non-rotatably received through said hollowed shaft and is longitudinally movable relative to said hollowed shaft of said second gear;
wherein said first gear imparts rotation to said second gear and said chuck output shaft to rotate said chuck output shaft about the rotational axis of said chuck output shaft when said motor is activated; and
a sensor responsive to at least one of (a) movement of said chuck output shaft relative to said second gear and said sensor and (b) proximity of said chuck output shaft to said sensor, and wherein said sensor generates an output signal indicative of said at least one of a movement of said chuck output shaft relative to second gear and said sensor and (b) proximity of said chuck output shaft to said sensor, and wherein said motor is responsive to said output signal.

4. A rotary tool for driving a fastener, said rotary tool comprising:
a motor operable to provide a rotational force and having a rotational axis;
a motor output shaft associated with said motor;
a drive shaft rotatably driven by said motor via said motor output shaft, said motor output shaft and said drive shaft having substantially parallel axes of rotation, said drive shaft comprising a first gear at its end opposite said motor output shaft;
a chuck assembly, said chuck assembly comprising a second gear and a chuck output shaft for rotatably driving a fastener, said chuck output shaft having a rotational axis that is non-parallel to the rotational axis of said drive shaft wherein said chuck output shaft is adapted to rotate with said second gear and translate axially relative to said second gear;
wherein said first gear imparts rotation to said second gear and said chuck output shaft to rotate said chuck output shaft about the rotational axis of said chuck output shaft when said motor is activated;
a sensor responsive to at least one of (a) movement of said chuck output shaft relative to said second gear and said sensor and (b) proximity of said chuck output shaft to said sensor, and wherein said sensor generates an output signal indicative of said at least one of a movement of said chuck output shaft relative to second gear and said sensor and (b) proximity of said chuck output shaft to said sensor, and wherein said motor is responsive to said output signal; and
a magnetic element disposed at said chuck output shaft and movable with said chuck output shaft and relative to said sensor, wherein said sensor is responsive to a magnetic field generated by said magnetic element to detect proximity of said magnetic element, and wherein said sensor generates said output signal indicative of the proximity of said magnetic element.

5. The rotary tool of claim 4, wherein said output signal varies proportionally in response to a distance of said magnetic element from said sensor.

6. The rotary tool of claim 4, wherein said motor is activated in response to said output signal being indicative of said magnetic element being a threshold distance from said sensor.

7. The rotary tool of claim 4 further comprising a biasing element at said chuck assembly, said resilient element biasing said chuck output shaft outward from said rotary tool.

* * * * *